Jan. 4, 1966   P. W. SENFLEBEN   3,226,770
MOLDS FOR SHOE SOLE AND HEEL UNITS
Filed Jan. 11, 1963

Inventor
Paul W. Senfleben
By his Attorney
Edward W. Fearing

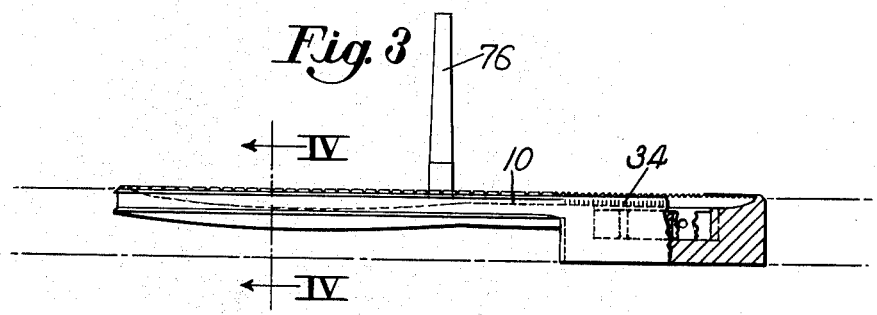
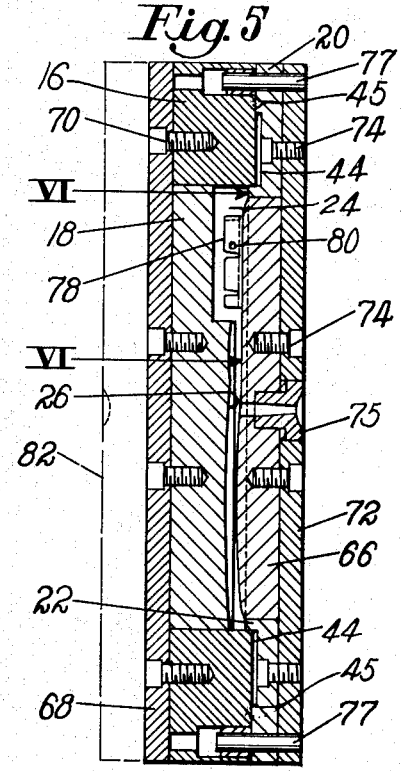

Jan. 4, 1966    P. W. SENFLEBEN    3,226,770
MOLDS FOR SHOE SOLE AND HEEL UNITS
Filed Jan. 11, 1963    7 Sheets-Sheet 3
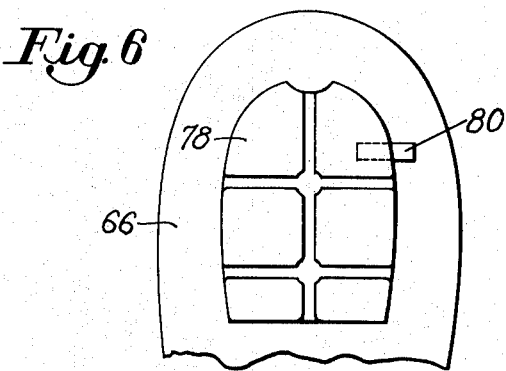
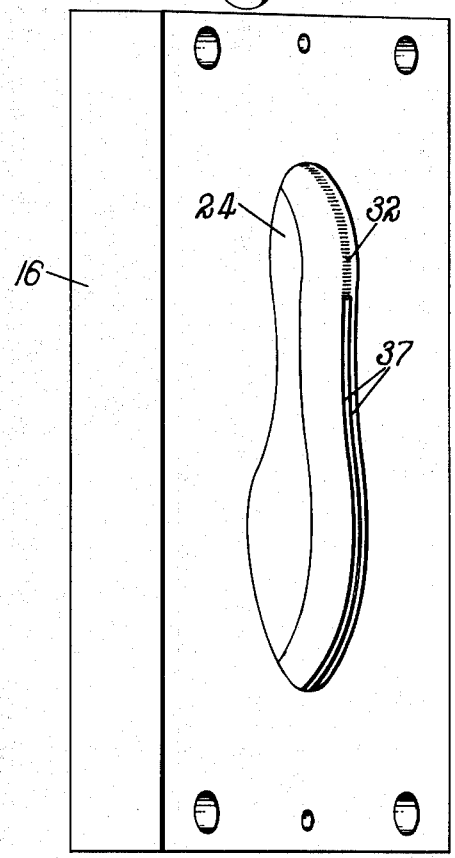

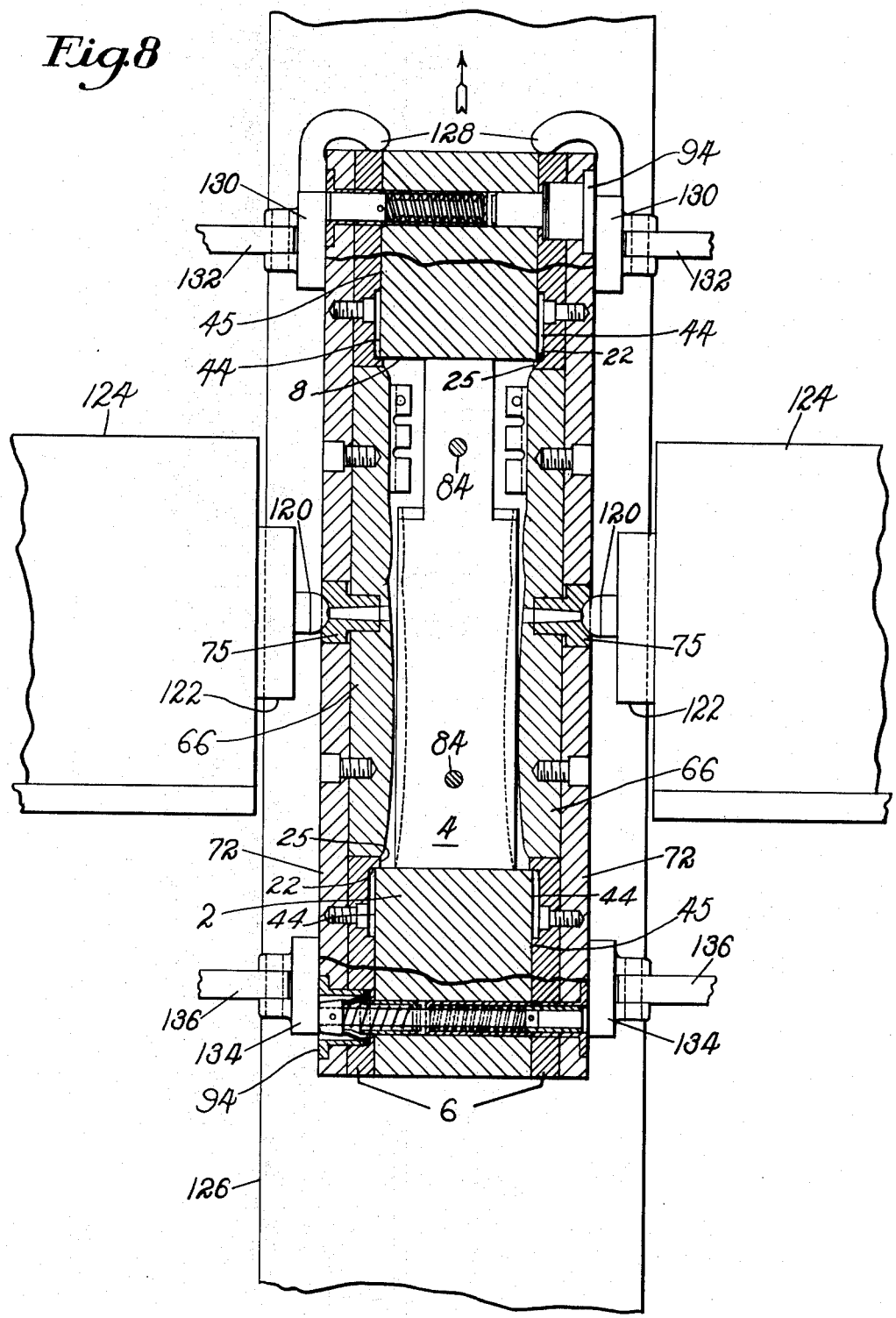

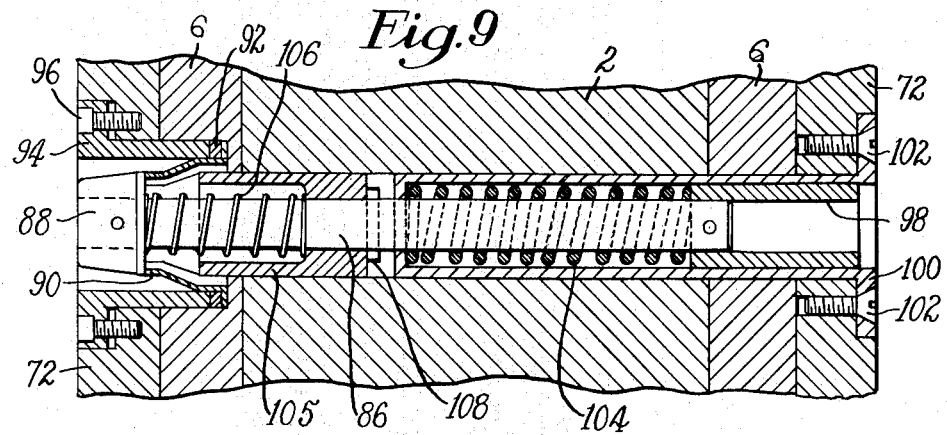
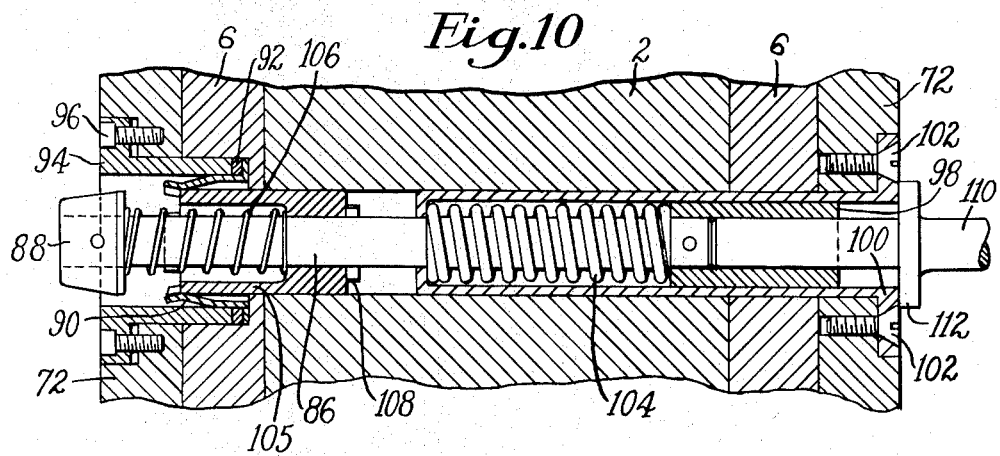
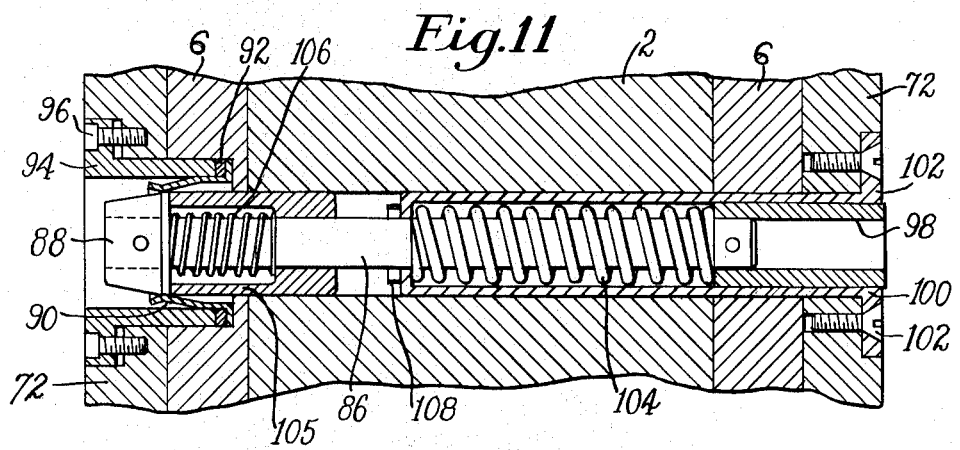

Jan. 4, 1966   P. W. SENFLEBEN   3,226,770
MOLDS FOR SHOE SOLE AND HEEL UNITS
Filed Jan. 11, 1963   7 Sheets-Sheet 6
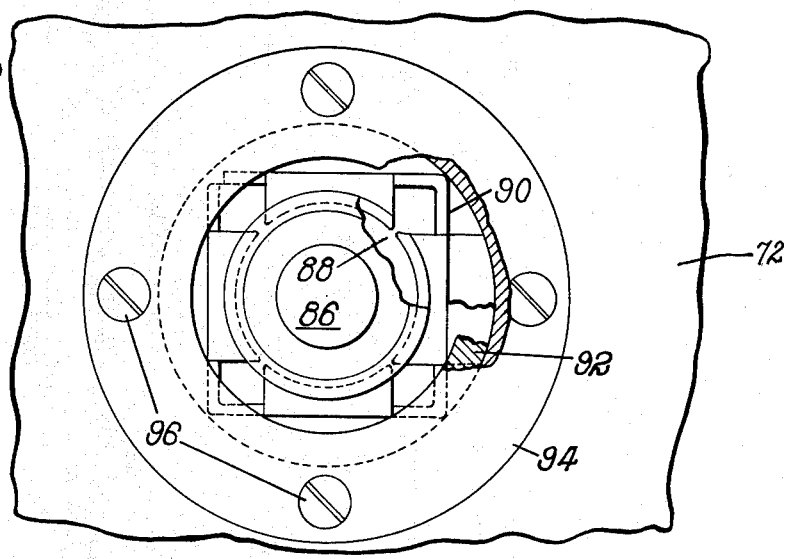
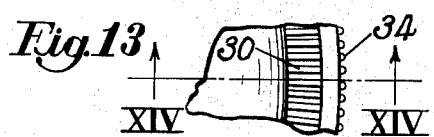
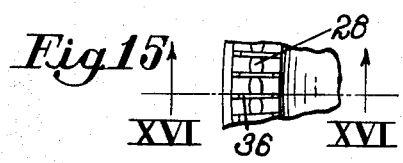
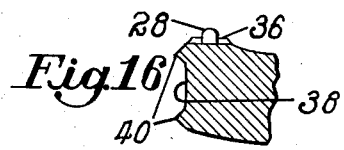
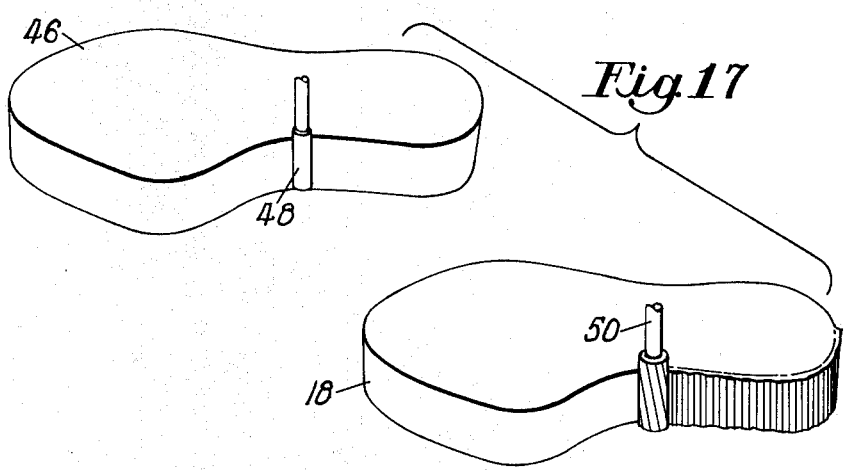

Jan. 4, 1966 P. W. SENFLEBEN 3,226,770
MOLDS FOR SHOE SOLE AND HEEL UNITS
Filed Jan. 11, 1963 7 Sheets-Sheet 7
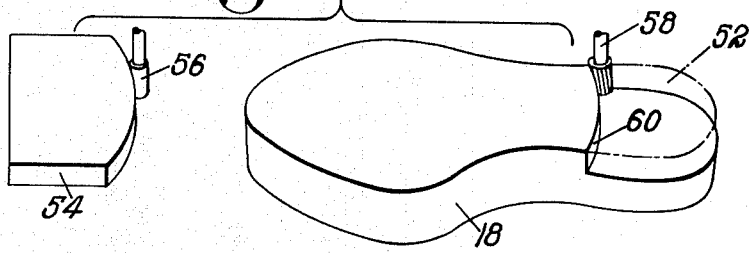
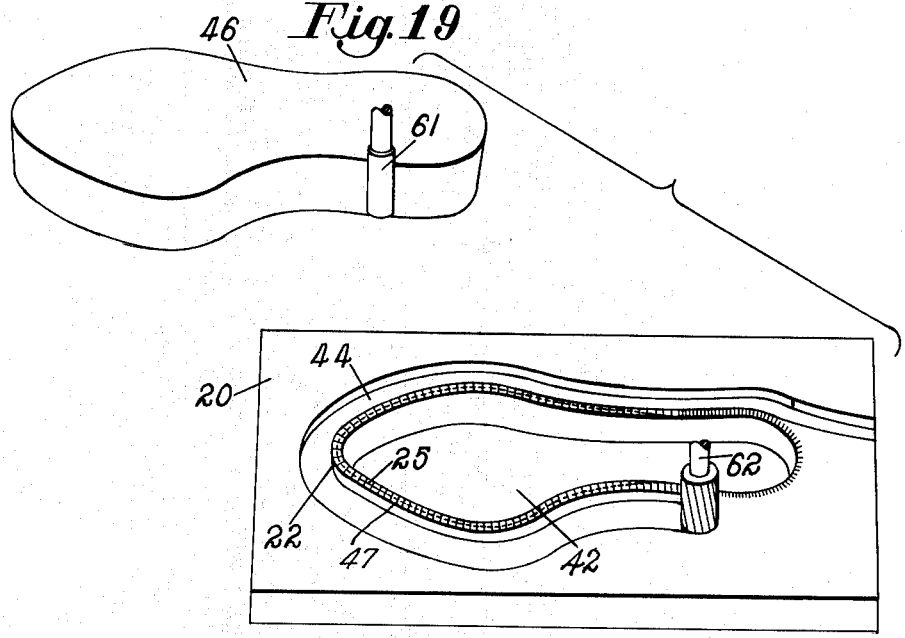
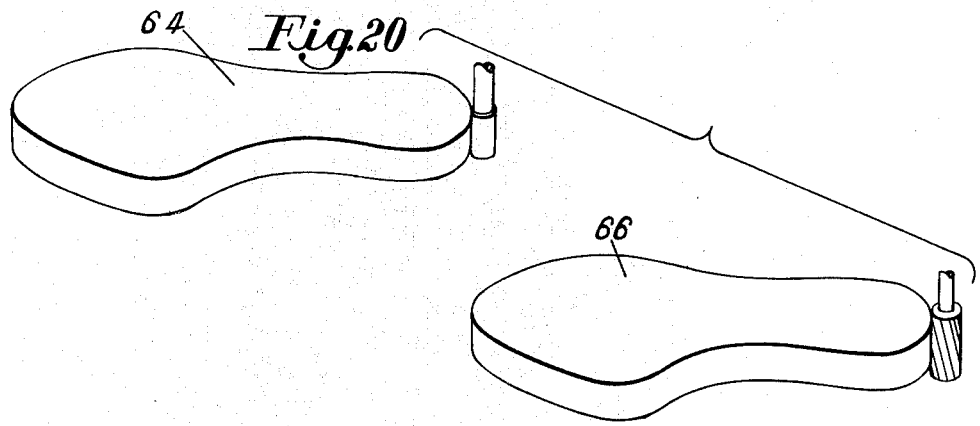

United States Patent Office 3,226,770
Patented Jan. 4, 1966

3,226,770
MOLDS FOR SHOE SOLE AND HEEL UNITS
Paul W. Senfleben, Beverly, Mass., assignor to United Shoe Machinery Corporation, Flemington, N.J., a corporation of New Jersey
Filed Jan. 11, 1963, Ser. No. 250,895
12 Claims. (Cl. 18—42)

This invention relates to improvements in molds for making decorated shoe sole and heel units of rubbery material.

In United States Letters Patent No. 3,021,543, granted February 20, 1962, upon application of G. J. Crowley, there is disclosed a method of making shoes wherein a one piece sole and heel unit of thermoplastic compound, comprising vulcanizable rubber, polyvinyl, or other similar material is premolded separately from a shoe and attached to the shoe bottom with no further finishing operations required.

The greatest impediment to the use of decorated, one-piece shoe sole and heel units composed of vulcanized or thermoplastic materials is in the provision of a series of molds for a complete range of shoe sizes, which molds must be manufactured on an economically feasible basis, while still preserving complex features of decoration capable of faithful and accurate reproduction in the units. This cannot be done with uniformity by the biscuit impression type mold without waste of molding material where different sizes of units are required. It is impossible for a biscuit to fill a mold exactly without overflow and at the same time to provide adequate pressure on intricate engraved impressions of decorations in the mold. Even with a liquid injection mold, control of air leakage by the use of essential vents without flash formation is troublesome.

As an example of such decoration a configuration simulating that of a Goodyear welt shoe sole may be selected. A Goodyear welt shoe may have an outflanged welt along its sole margin with threads of an outseam connecting it with an outsole. Tht edge of the outsole in a Goodyear welt shoe, also, is set and burnished with a heater tool to create a polished lengthwise concavity having prominent ridges along its top and bottom corners.

In order to simulate the threads of an outseam in a Goodyear welt shoe for a cement shoe constructed in accordance with the Crowley method, a mold for reproducing a sole and heel unit must be engraved with impressions of such decoration, which can readily be duplicated with uniformity in a full set of molds for a complete range of shoe sizes without requiring highly skilled effort or prohibitive costs. The cost of such molds may more fully be appreciated when it is realized that an average set requires 30 to 40 different sizes graded in dimensions accurately proportioned with relation to each other. For this reason the cost of mold manufacture has heretofore been disproportionate to the amount of possible profit ordinarily obtainable.

The primary objects of the present invention are to provide less expensive and improved liquid injection sole and heel unit molds for manufacturing shoes in accordance with the Crowley method, in which a simplified type of construction may be employed, such that uniform accuracy in reproducing decorations warrants the expense involved for a full range of mold sizes.

Another object of the invention is to improve the construction of molds for shoe sole and heel units to enable easier attainment of sharply defined decorative effects, especially along the exposed upper surface on a projecting marginal portion on a sole unit. In this respect the required configuration of the improved molds is obtainable by well known machine tool procedures, in which the expense of present day hand guided machining is substantially eliminated or reduced to an insignificant proportion of the effort required.

The most common difficulties encountered with the use of molds for shoe sole and heel units are in the formation of "flash" or projecting fins on such units and failure to reproduce intricate impressions of a mold on account of air entrapment in the form of voids during the molding operation. Thus, if air leakage is too great, flash will be formed and if there is too little air leakage voids will occur, especially in the decorated areas.

Still further objects are generally to provide simplified and improved molds for sole and heel units capable of being decorated more effectively with intricate designs not considered economically practicable heretofore and to provide a simplified and improved machine for utilizing the molds.

To insure more faithful and sharply defined decorative effects on a one-piece sole and heel unit, especially in a narrow band along the projecting marginal portion most clearly visible during wear of a shoe containing the unit, according to an important feature of the present invention, a mold assembly is provided, in which there is a linear air vent clearance running along either side of an engraved shoulder on a cover plate, which shoulder telescopes with the cavity of the mold assembly. Preferably, the mold assembly comprises a one-piece flat main body block having an open ended cavity closed at one end by a tread former shaped with an impression of the bottom surface on the sole unit and at the other end by a cover plate formed with a flash blocking shoulder on the flange arranged with an air vent clearance with the cavity in the main body block at one side of the decorated band on the sole unit, the cover plate being provided in turn with an opening extending through its thickness similar to but smaller in cross section than the cavity in the main body block to expose in the cavity an end surface on the flange engraved to form the decorated band. As illustrated, a shoe bottom seat forming member fills the opening in the cover plate with the second linear air vent clearance. A mold of this construction not only more readily transfers its impressions to a sole and heel unit, especially where there is decoration along the narrow marginal portion of the unit, but also such mold is more adaptable than prior molds for machine production methods and for versatility in accommodating different styles of decoration.

Furthermore, molds constructed in accordance with these principles are capable of liquid compound being used to advantage with an elementary form of injection molding machine, and more particularly so if a double mold having spaces for left and right sole units is constructed by machine guided operations for the manufacture of a pair of sole and heel units at a time. Further features of the invention reside in novel and improved single or double mold constructions for such units.

These and other features, as hereinafter described and claimed, will readily be apparent to those skilled in the art from the following detailed specification, taken in connection with the accompanying drawings, in which:

FIG. 3 is a view in side elevation and partly in section of a sole and heel unit formed in the mold of FIG. 2;

FIG. 4 is a sectional view of the sole and heel unit on a somewhat enlarged scale, taken along the line IV—IV of FIG. 3;

FIG. 5 is a lengthwise sectional view of a single mold capable of being used in the machine of FIG. 1;

FIG. 6 is a detail view of the heel portion of the mold shown in FIG. 5, as seen from the line VI—VI of that figure;

FIG. 7 is a perspective view of the main body block in the mold of FIG. 5;

FIG. 8 is a sectional plan view on an enlarged scale of the double mold shown in FIG. 2, while supported in the machine of FIG. 1;

FIG. 9 is a sectional detail view on an enlarged scale of a temporary mold fastening intended for use in either type of mold illustrated in FIGS. 5 or 8, with the mold parts locked together;

FIG. 10 is a similar sectional view showing the condition of the fastening after the mold parts are unlocked;

FIG. 11 is a similar view of the fastening showing the condition when the fastenings are being removed;

FIG. 12 is a detailed view on an enlarged scale at the locking end of the temporary fastening;

FIG. 13 is a detail plan view of a portion of heel edge ornamentation readily accomplished in the mold of the present invention;

FIG. 14 is a sectional view taken along the line XIV—XIV of FIG. 13;

FIG. 15 is a detail plan view of a portion on a sole edge ornamented with a design resembling a Goodyear welt outseam, according to the present invention;

FIG. 16 is a sectional detail view, taken along the line XVI—XVI of FIG. 15;

FIG. 17 is a schematic diagram showing a machine directed method for shaping a tread former employed in the mold of the present invention;

FIG. 18 is a schematic view showing a machine directed method by which a curved heel breast molding surface may be cut in the tread former;

FIG. 19 is a similar view showing a machine directed construction for a flash blocking shoulder in a cover plate for the present mold; and FIG. 20 is a similar view showing a machine directed method of constructing a shoe bottom forming member for the mold.

The development of the synthetic plastic parts has made great strides in the production of materials capable of being substituted by reason of their mechanical qualities but especially in shoe manufacturing procedures. In the past the use of synthetic substitutes for leather soles has met with firm opposition from those who are allergic to such materials and from those who by tradition and long usage have confirmed ideas about the appearance of a shoe resembling one which has a conventional leather sole. The discovery of improved synthetic materials which minimize allergic reaction has avoided many of the problems encountered in commercializing shoes with synthetic soles, but the construction of molds capable of being engraved with impressions for reproducing in a sole unit decorations simulating configurations of a leather soled shoe or other design has been a problem for which the solution is not easily reached.

Figure 2:
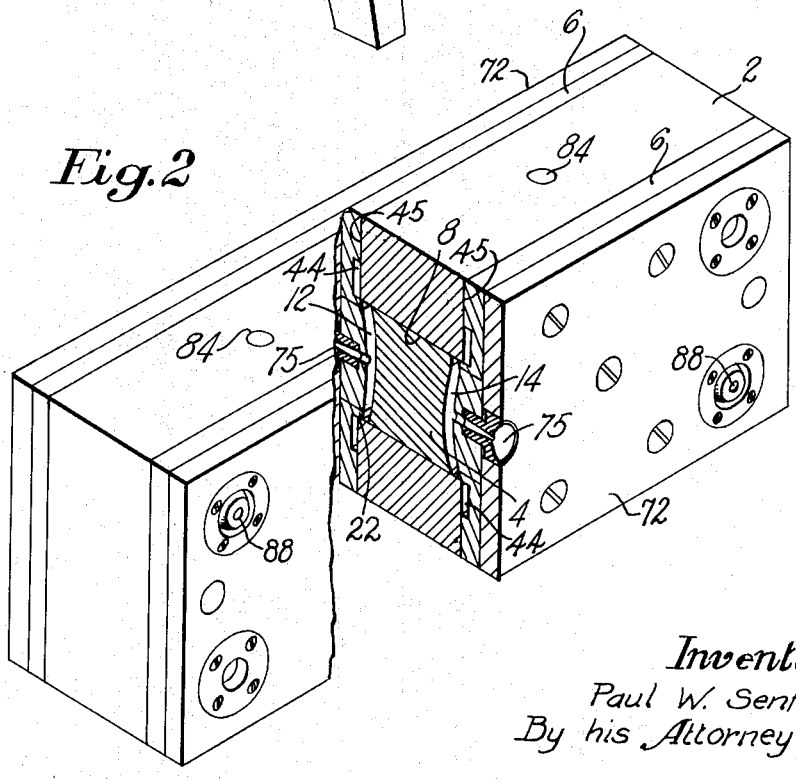
FIG. 2 is an enlarged perspective view partly broken away and in section of a double mold capable of being utilized with the machine of FIG. 1.

Referring more particularly to FIG. 2 of the drawings, wherein there is illustrated a double mold assembly comprising a single piece, flat main body block 2 of uniform thickness and with parallel sides, a tread former 4 and a pair of cover plates 6 to provide two similar molding spaces. The main body block 2 has a smooth walled cavity 8 of uniform cross section throughout the thickness of the block, the cross section of the cavity 8 corresponding to the contour of a shoe sole and heel unit 10, illustrated more specifically in FIGS. 3 and 4. From these figures it will readily be apparent that the sole and heel unit produced with the present mold has transverse curvature but no longthwise curvature and has top and bottom surfaces exactly parallel, as disclosed in the prior Crowley patent. Without adequate transverse curvature in a sole unit irritation may be produced by concentrated pressure of the center of a wearer's foot as by allergy and the lack of resemblance to a leather shoe is frequently found objectionable.

According to the present invention a mold having all of the advantages of that disclosed in the prior Crowley patent, such as sharp outline impression, and none of the difficulties in regulating air leakage or preventing flash formation, is provided by the use of a cover plate telescoping with the body block 8 inside its molding cavity with a flash-free air vent clearance. Thus, the present mold is not dependent upon heavy clamping forces to hold the cover plate rigidly in place on the main body block, the present mold tolerating appreciable separation of the cover plate from the body block through its telescoping relation of the parts without permitting flash formation.

The advantages of the present type of mold construction are obtainable either with a single space mold (FIG. 5), or with a double space mold illustrated in FIGS. 2 and 8, the molding space, indicated at 12, being of a configuration corresponding to a right sole and heel unit and the molding space 14 corresponding to a left unit. In either case the space for a particular size of unit is of the same peripheral contour regardless of whether it is formed in a double mold or in a single one.

A single unit mold is shown in FIG. 5, in which case the body block, indicated at 16, it about half of the thickness of the double unit body block 2. In the single mold the cover plate, indicated at 20, is of the same thickness as that in the double mold. In either instance the cover plate has a flange forming a flash blocking shoulder 22 engaging the cavity 8 inside the main body block 2 (FIGS. 2 and 8) or a cavity 24 ( FIGS. 5 and 7) in the body block 16. The cover plate 6, the tread former 4 and the body block 2 define the molding spaces in the double unit mold of FIGS. 2 and 8. The cover plate 20 and a tread former 18 define with body block 16 a molding space 26 in the single unit mold of FIGS. 5 and 7.

To ornament the visible marginal portion of the sole and heel unit and to assist in providing a flash-free air leakage clearance of adequate extent, the thickness of the cover plate has been reduced, with the exception of the flash blocking shoulder 22 fitting closely inside the cavity 24 and conforming with its shape. A flat right angle face 25 (FIG. 19) of the shoulder 22 is engraved with suitable decorative impressions for the sole unit, usually in the form of projections 28 (FIGS. 15 and 16) simulating the exposed thread of an out seam on a welt in a Goodyear welt shoe. In the alternative it may be merely knurled at 30, as in FIGS. 13 and 14, to correspond with a treatment often given for a less expensive Goodyear welt shoe. In either case the heel portion of the cover plate on the face of its shoulder 22 has similar knurling 30 or other convenient ornamentation engraved in the side wall of the cavity within the body block, such as a line of indentations 32, as in FIG. 7. This line of indentations forms a series of small ribs 34 (FIG. 3) on the edge of the heel portion of the sole and heel unit (see also FIG. 13). Since the ribs 34 are relatively small their appearance is not distinguishable from indentations usually formed about the heel of a Goodyear welt shoe. A similar form of decoration may be provided in simulation of Goodyear outsole stitches in FIGS. 15 and 16, wherein stitch separation marks 36 on the sole unit appear in the form of raised ridges rather than actual indentations. The ridges and ribs are more convenient to produce on a sole by reason of the fact that it is easier to indent or engrave the mold in the proper manner than to add on material corresponding to knurling and indentations desired on a sole unit.

The impressions of ornamentation along the right angle face 25 of the flash blocking shoulder 22, effected in the manner outlined, does not require hand guided engraving operations but may be accomplished rapidly by means of a swaging tool or toothed wheel according to well known machine tool directing practices. Since the entire right angle face of the shoulder 22 on the cover plate 6 or 20 lies in a single flat plane, decoration of this face is readily accomplished without requiring special hand guided work.

To provide decoration for the sole edge, simulating that found on the burnished edge of an outsole in a Goodyear welt shoe, the side walls of the cavity 8 or 24 are engraved with grooves 37 (FIG. 7) running parallel to the flat surfaces of the body block, so that they may readily be formed by mechanical directing action along those surfaces. The result of the grooves is that the edge of the sole unit may be provided with a polished concavity 38 (FIG. 16) bounded by sharp projecting corner edges 40 closely resembling those provided on the sole of a Goodyear welt-shoe.

To improve the flash-free air leakage clearance between the shoulder 22 and the inner wall of the cavity 8 in the main body block, the shoulder is constructed to yield slightly while being inserted in the cavity 24 and an opening 42 (FIG. 19) is formed in the cover plate 20 extending through the thickness of the cover plate but having a smaller but similar cross sectional area to that of the cavity 24 in the main body block. The side wall of the opening 42 is equally spaced from the flash blocking shoulder 22, so as to impart uniform flexibility to the shoulder throughout its length. Outside the shoulder there is also formed a stress relieving channel 44 to increase still further the flexibility of the shoulder. With such shoulder a smooth telescoping action will occur while applying or removing the cover plate from the main body block. The stress relieving channel 44 also provides space to receive any molding material accidentally left remaining on an outer face 45 (FIGS. 2, 5 and 8) of the main body block, while providing area on the cover plate outside of the channel sufficient to form a firm abutment against which the main body block is pressed and rigidly located. The same channel and locating face construction is identified by the same reference numerals in the double mold of FIGS. 2 and 8.

The flash blocking shoulder 22 is formed with its outside corner 47 (FIG. 19) as sharp as possible in order to reduce the flash formation to a minimum. It is also this corner which is most likely to be damaged in applying the cover plate 20 to the body block and, accordingly, the cover plate itself is preferably composed of steel; whereas, the body block may be composed of softer, non-ferrous metal, such as aluminum without likelihood of undesirable wear, resulting in flash formation.

The order of machining operations performed on the different mold parts is as follows:

(1) A sheet metal template (not shown) is prepared with an opening corresponding in contour to that of a sole to be molded.

(2) With the sheet metal template the opening 8 (FIG. 2) of 24 (FIG. 7) in a body block blank, is formed by a profiling machine with a simple milling operation. The milling operation is directed by the template.

(3) A hardened plug 46 (FIG. 17) of plastic material, such as plaster of paris is cast in the cavity 8 of the main body block.

(4) The plug 46 is mounted on a machine for duplicating the profile of the plug in a rough aluminum tread former 18 by utilizing a guide roll 48 brought into engagement with the plug, which directs a milling cutter 50 for duplicating the contour of the plug on the tread former 18.

(5) A reduced area 52 (FIG. 18) is cut away on the tread former 18 to provide space for molding a heel, utilizing a similar profiling machine and employing a curved template form 54 engaged by a roll 56 and arranged to direct a milling cutter 58 to form a surface 60 on the tread former 18, corresponding to the breast of a heel. Other suitable concavities are provided on the tread former to shape it with an impression of the lower transversely curved surface of the sole and heel unit and to decorate it in accordance with requirements.

(6) The plug 46 is again mounted on the profiling machine to guide the formation of the stress relief channel 44 in the cover plate 20 for producing the flash blocking shoulder 22, a guide roll 61 being employed to direct the movements of a milling cutter 62, as in FIG. 19.

(7) Decoration on the face of the shoulder 22 is then formed by a swaging operation directed by the shoulder.

(8) As a result of the swaging operation the outer corner of the shoulder may bulge irregularly into the relief channel 44, so that a second run of the milling cutter 62 directed by the plug 46 may be required.

(9) The material on the surface 45 of the cover plate outside of the stress relieving channel 44 is partly removed to cause the shoulder 22 to project above the remainder of the surface outside the channel.

(10) A second sheet metal template (not shown) is then made with an opening corresponding in contour with the shoe bottom and the opening 42 is formed within the flash blocking shoulder of the cover plate 20, as in the case of the cavity 8 or 24 in the main body block. (Operation #2).

(11) A new plug 64 is then molded by using the opening 42 as a container.

(12) The plug 64 is used to duplicate an aluminum shoe bottom seat forming member 66 in the profiling machine (FIG. 20), so that it will fit snugly within the opening 42 of the cover plate 20.

(13) The shoe bottom seat forming member 66 is suitably shaped with a convex surface, corresponding to that of the shoe bottom with its edges lying in the same plane as the ornamented face 25 on the flash blocking shoulder 22.

When the mold is assembled, the tread former 4 or 18 filling the cavity in the main body block and the bottom seat forming member 66 filling the opening in the cover plate 6 or 20, the parts of the mold are fixedly connected together by mounting them on a base platen 68 (FIG. 5), through the use of screws 70 passing through the platen and into threaded engagement with the body block 16 and tread former 18. Similarly the parts of the cover plate 20 with the bottom seat forming member 66 are connected together through the use of a backing platen 72 through which passes screws 74 engaging the cover plate and seat forming member. In this way a flash free leakage clearance at a critical area may readily be obtained. For convenience in charging the molding space 26, a receptacle comprising a sprue passage barrel 75 is fitted into each backing platen 72 and seat forming member 66, which for all practical purposes forms a part of the cover plate 20. In the completed sole and heel unit 10 the barrels 75 are disposed oppositely and form a tapered sprue 76 on each unit, as shown in FIG. 3.

To enable the mold to be opened up and reclosed readily without interference between the telescoping action of the flash blocking shoulder 22 with the edge of the cavity in the main body block, dowel pins 77 are provided fitting bushings in the main body block. Suitable means also may be provided for holding the mold parts clamped together temporarily before being charged in a molding machine. To reduced the weight of the heel portion of the sole and heel unit, a heel core block 78 is secured to the seat forming member 66 either by welding or by removable screw fastenings, so that the style of the core piece may be changed readily.

For convenience in removing a completed sole and heel unit from a mold, especially when decorative ridges along the edge of a sole unit are formed by grooves 37 in the main body block tending in the completed sole and heel unit to lock the unit to the mold, the heel core block 78 has a projection comprising a pin 80 extending laterally, as best shown in FIG. 6. When the mold is charged, the molding material surrounds and grips the pin, so that upon removal of the cover plate the heel portion of the sole and heel unit is dislodged from the molding cavity and swings clear of the molding cavity while the sole portion will remains in the cavity. By grasping the heel portion of the unit the ridges on the sole portion may readily be removed from the grooves 37 by pulling lengthwise as well as outwardly from the molding cavity. In this way the sole unit is stretched slightly so as to reduce its width and disengage the ridges 40 from the grooves 37.

A mold constructed in accordance with the principles outline is effective for use with a simplified form of molding machine and, whether the mold is of the single or double space type, semiautomatic operation of the machine is possible, a series of molds being presented successively to an injection station in the machine and carried through the machine after being charged with plastic material.

While it is proposed to utilize a machine capable of forming two sole and heel units at the same time, a single space type mold also may be utilized in the machine by using a spacer 82, indicated by the dotted lines in FIG. 5, to bring the thickness of the single space mold up to that required by the double space mold. While the single space type mold is secured together by screws and dowel pins, as shown in FIG. 5, a corresponding construction can be utilized to advantage in the double space type also. However, in the double space mold a single double sided tread former 4 is employed secured within the opening of the main body block 2 by a number of drive pins 84 preferably formed with a slight taper to secure the parts rigidly together, as shown in FIG. 2. The double tread former has its peripheral contour fitting the cavity of the main body block and provides a divider for the two mold spaces 12 and 14. Also, in the double space mold the backing platens 72 are employed but, obviously, no base platen is needed.

To hold the cover plates against separation from the main body block, quickly releasable latching fasteners are provided. These latching fasteners are best illustrated in FIGS. 9, 10, and 11, indicating their manner of operation. Each removable fastener comprises a slide rod 86 to one end of which is pinned a frusto-conical collar 88 arranged to slide between the prongs of a square yielding latch 90 (see FIG. 12) having projecting corners of its base seated within a counter bore in the adjacent cover plate 20. To secure the latch 90 in place it is surrounded by a washer 92 and a flanged clamp sleeve 94 through the flanges of which pass a series of fastening screws 96 into threaded engagement with the adjacent backing platen 72. At the opposite end of the slide rod 86 is pinned to a bushing 98 slidingly mounted in a second flanged sleeve 100 secured at its outer end within a counter bore in the adjacent backing platen 72 by screws 102 threaded into that backing platen. The other end of the tube 100 has an inturned flange surrounding the slide rod 86 and disposed within the tube is a compression spring 104. The other end of the compression spring acts in the bushing 98 and tends to draw the slide rod toward the right in FIGS. 9, 10, and 11. It is apparent that if the collar 88 is pressed through the prongs of the latch 90 until the prongs spring beneath the collar to the positions shown in FIG. 10 the parts will be locked securely together by the yielding action of the spring 104.

In order to release the fastener quickly, so that the cover plates 20 may be removed for access to the molding paces, the slide rod 86 is also surrounded by a hollow unlocking cylinder 105 having an enlarged opening at one end within which is a coil spring 106 acting between the cylinder 105 and the collar 88.

To retain the spring 106 under compression the slide rod has passing through it a pin 108 in a position to be engaged by the cylinder 105. When the slide rod 86 is engaged by the pin 108 and forced to the left into the position shown in FIG. 10 the cylinder 105 is pressed between the prong of the latch 90 and wedges the prongs away from the collar 88. The collar 88 is constructed with maximum diameter the same or slightly less than that of the cylinder 105. Accordingly, the cylinder wedges the prongs of the latch away from the collar as in FIG. 10, the cylinder will be held frictionally from retraction until the slide rod 86 is moved toward the right, as shown in FIG. 11, whereupon the collar 88 will slide between the prongs of the latch and escape.

To enable the locking rod 86 to be shifted, as desired, the bushing 98 is engaged by a removable key pin 110 (FIG. 10). When inserted in the bushing 98 the pin may be depressed until the collar 88 snaps beyond the prongs of the latch 90 into a locked position, the snapping action being readily indicated by the released of frictional pressure against movement of the key pin 110. The fastening device then holds the mold together. To assist in unlocking the fastening device the key pin 110 has formed on it a flange 112 located at a position to cause the unlocking cylinder 105 to enter between the prongs of the latch 90. When the flange 112 is pressed into engagement with the tube 100 and released the fastening device and the mold parts may be separated.

Figure 1:
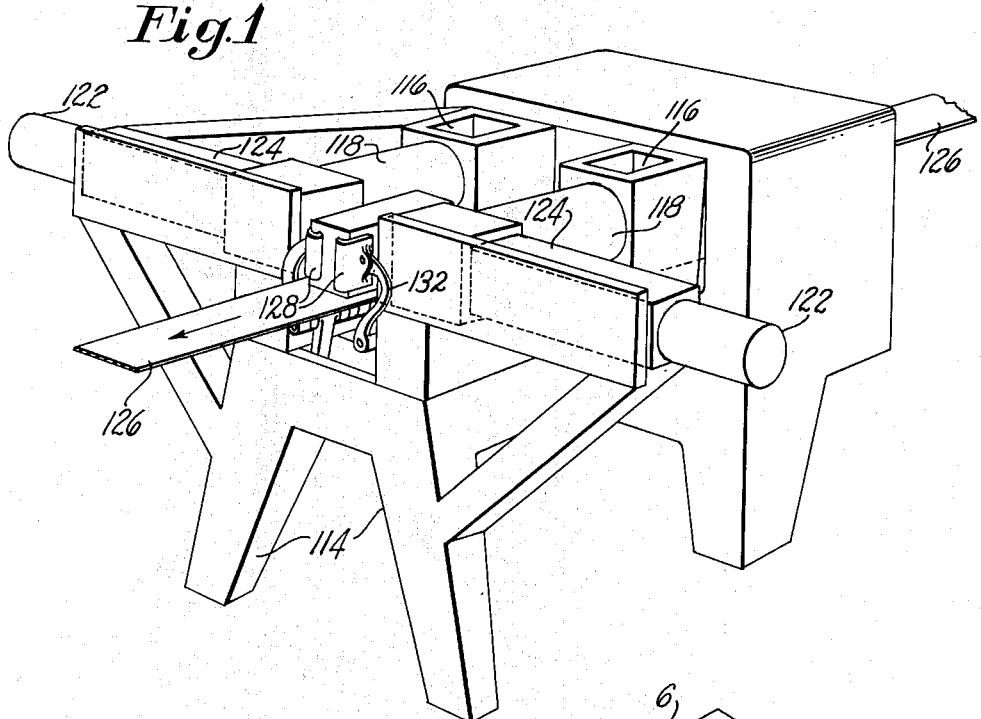
FIG. 1 is a perspective view of a machine for molding integral shoe sole and heel units, in accordance with the present invention.

A machine in which the molds of the present invention are readily utilized is illustrated in FIG. 1 and comprises a frame 114 having reservoirs 116 for a supply of molding material. From the reservoirs 116 the molding materials are forced through cylinders 118 into injection nozzles 120, best shown in FIG. 8, fitting depressions in the sprue barrels 75. The injection nozzles are supported on slides 122 mounted in guideways 124 for simultaneous movement toward and from each other into engagement with the respective sprue barrels 75 of a mold between the nozzles.

To transport the molds toward and from proper injection position where the nozzles 120 may enter the sprue barrels 75, the frame 114 of the machine is provided with a central passageway, through which is guided a carrier in the form of a conveyor belt 126, running in the direction of the arrows in FIGS. 1 and 8. During the course of movement of the molds through the machine the forward ends of the molds are engaged by a pair of fingers 128 extending in the path of movement of the molds from a pair of clamp shoes 130, illustrated in FIG. 8. The clamp shoes 130 are hinged on a pair of arms 132 mounted for rocking movement, one at either side of the conveyor belt 126. Also at the trailing end of a mold while in rest position is a second pair of clamp shoes 134 hinged on additional arms 136 movable in unison with the arms 132 toward and from a mold, the fingers 128 stopping the mold at a charging position where the nozzles 120 may enter the sprue barrels 75. As soon as the mold is engaged by the fingers 128 the cover plates on the mold are rigidly secured together against any pressure developed within the molding spaces during charging. The nozzles engaging the sprue barrels also assist in clamping the molds in place and prevent separation of the cover plates from the body block.

The operation of the molding machine may be wholly manually controlled or may be automatically controlled by suitable feelers and sensing systems connected with suitable actuating mechanism.

The nature and scope of the invention having been indicated and embodiments having been particularly described, what is claimed is:

1. A shoe sole and heel unit mold assembly, comprising a main body block of uniform thickness having a smooth walled cavity fitting the outer contour of a shoe sole and heel unit and a double tread former shaped on either side with an impression of the lower surface of a unit, the impression for one side corresponding to that for a right unit and for the other side corresponding to that for a right unit and for the other side corresponding to that for a left unit and a peripheral contour conformed to the wall of the cavity in the main body block and secured therein to provide two molding spaces, in combination with two cover plates engaging opposite sides of the body block inside its cavity with flash-free air vent clearances to enable sharp outline impressions about peripheries of the mold spaces without leakage of molding material.

2. A shoe sole and heel unit mold assembly, comprising a flat main body block having a cavity fitting the outer contour of a shoe sole and heel unit, the sides of the cavity being inscribed with a groove running parallel to a flat surface of the body block and a cover plate engaging the flat surface of the body block and provided with portions extending inside the cavity to form a shoe bottom seat in the unit and a weight reducing core block in the heel portion of the unit, in combination with a pin extending laterally from the core block to insure dislodgment of the heel from the body block when the cover plate is separated therefrom, thereby enabling the sole portion of the unit to be removed from the groove by grasping the heel portion.

3. A mold assembly for a shoe sole and heel unit having a narrow decorative band on a top marginal portion, said assembly comprising a flat one-piece main body block provided with parallel sides and with an open ended cavity fitting the contour of the unit, and a tread former in the cavity shaped with an impression of a bottom surface of the unit, in combination with a removable cover plate having a flat faced flange engraved with a decorative impression for the band on the top portion of the unit, said flange forming along its outer side a shoulder telescoping with the cavity in the main body block and having along its inner side a linear air vent clearance, the telescoping shoulder in the cavity of the body block providing a similar clearance for the outer edge of the decorated band.

4. A shoe sole and heel unit mold assembly, as in claim 3, in which there is formed in the cover plate about the flash blocking shoulder a stress relieving channel to insure proper seating of the shoulder within the cavity of the main body block.

5. A mold assembly for a shoe sole and heel unit having a narrow decorated band on a top marginal portion, said assembly comprising a one-piece main body block provided with a cavity fitting the outer contour of a unit and a removable cover plate having a flange engraved with a decorative impression for the band on the top margin of the unit, said flange forming along its outer side a shoulder telescoping with the cavity in the main body block, said cover plate having an opening extending through its thickness of smaller cross section than the cavity of the main body block, in combination with a shoe bottom seat forming member fitting within the opening of the cover plate to provide a linear air vent clearance along the inner edge of the decorated band on the sole and heel unit, the telescoping shoulder within the cavity of the body block providing a similar clearance for the outer edge of the decorated band.

6. A mold assembly, as in claim 5, in which the engraved impression is formed on a flat face of the flange.

7. A mold assembly, as in claim 6, in which the inner wall of the cavity in the main body block for forming the heel of the unit is engraved with knurling to simulate the contour of the heel in a Goodyear welt shoe.

8. A mold assembly, as in claim 6, in which the engraved impression simulates the exposed thread of an outseam on the welt of a Goodyear welt shoe.

9. A mold assembly, as in claim 5, in which the main body block is composed of easily machinable non-ferrous material and the cover plate is formed with a sharp flash reducing outside corner and is composed of steel to prevent damage to the outside corner of the telescoping shoulder, as the cover plate is pressed into the opening of the body block to close the mold.

10. A shoe sole and heel unit mold assembly, comprising a main body block of uniform thickness having a smooth walled cavity fitting the outer contour of a shoe sole and heel unit, a double tread former shaped on either side wtih an impression of the lower surface of the unit, the impression for one side corresponding to that for a right unit and for the other side corresponding to that for a left unit, said tread former also being shaped with a peripheral contour conforming with the wall of the cavity in the main body block and secured therein to provide two molding spaces, in combination with two cover plates engaging opposite sides of the body block inside its cavity with flash free air vent clearances to enable sharp outlined impressions about the peripheries of the molding spaces, each of said cover plates having an opening similar to but smaller in cross section than that of the cavity in the body block, a shoe bottom seat forming member filling the opening of each cover plate and a sprue barrel entering each seat forming member to enable both mold spaces to be filled at the same time.

11. A shoe sole and heel unit mold assembly comprising a main body block of uniform thickness having a smooth walled cavity fitting the outer contour of a shoe sole and heel unit, a tread former shaped with an impression of the lower surface of the unit and a peripheral contour fitting the cavity in the main body block and a cover plate engaging the body block inside its cavity, in combination with a quickly releasable latching fastener between the main body block and the cover plate to enable access to the molding cavity, said latching fastener comprising a slide rod passing through the cover plate and main body block, a frusto-conical collar at one end of the slide rod, a yielding latch on one of the parts through which the rod passes to enable locking engagement with the collar and a spring on the rod to hold the parts yieldingly in assembled positions.

12. A shoe sole and heel unit mold assembly, as in claim 11, in which a removable unlocking key is arranged to engage the slide rod and a cylinder on the slide rod acts to wedge the latch away from the collar to release the fastener.

References Cited by the Examiner

UNITED STATES PATENTS

| Re. 18,202 | 9/1931 | Polak. | |
| 1,136,336 | 4/1915 | Hill | 18—34 |
| 1,218,641 | 3/1917 | Fry | 18—42 |
| 1,451,510 | 4/1923 | Holmes | 18—42 |
| 1,740,082 | 12/1929 | Foerstner | 18—30 |
| 1,731,006 | 10/1929 | Goodwin et al. | 18—30 |
| 1,740,082 | 12/1929 | Foerstner | 18—30 |
| 1,746,282 | 2/1930 | Roberts. | |
| 1,768,093 | 6/1930 | Andre | 18—42 |
| 2,145,653 | 1/1939 | Hall | 18—42 |
| 2,442,607 | 6/1948 | Leguillian et al. | 18—30 |

WILLIAM J. STEPHENSON, *Primary Examiner.*